United States Patent [19]
Kisfaludy et al.

[11] 3,873,510
[45] Mar. 25, 1975

[54] PEPTIDES OF ACTH ACTIVITY CONTAINING α-AMINOOXY CARBOXYLIC ACID ON THE N-TERMINAL MOIETY, AND A PROCESS FOR THE PREPARATION THEREOF

[75] Inventors: Lajos Kisfaludy; Miklós Low; Lajos Dancsi; István Schőn; Tamás Szirtes; Olga Nyeki; Maria Szirmai; Laszlo Szporny; György Hajos, all of Budapest, Hungary

[73] Assignee: Richter Gedeon Vegyeszeti Gyar Rt., Budapest, Hungary

[22] Filed: Aug. 15, 1973

[21] Appl. No.: 388,546

[30] Foreign Application Priority Data
Aug. 18, 1972 Hungary.............................. RI 480

[52] U.S. Cl............................. 260/112.5, 424/179
[51] Int. Cl..................... C07c 103/52, A61k 17/06
[58] Field of Search.................. 260/112.5; 424/179

[56] References Cited
OTHER PUBLICATIONS
Kisfaludy et al., Chem. Abstr. 75:98305z (1971).
Kisfaludy et al., Chem. Abstr. 75: 110073g (1971).
Kisfaludy et al., Chem. Abstr. 72: 55894m (1970).

Primary Examiner—Elbert L. Roberts
Assistant Examiner—Reginald J. Suyat
Attorney, Agent, or Firm—Karl F. Ross; Herbert Dubno

[57] ABSTRACT

Novel peptides of ACTH activity, having a complete ACTH sequence from the N-terminal amino acid at least to the sixteenth amino acid, but containing optionally other amino acids in the place of the individual amino acids of the ACTH sequence, and always containing an α-aminooxy acid in the place of the first amino acid have been prepared by deblocking the appropriate protected peptide derivatives.

The new compounds, as well as their acid addition salts, derivatives or complexes possess potent ACTH activities and are resistant to enzymatic decomposition. They can be used in therapy with great advantages.

3 Claims, No Drawings

PEPTIDES OF ACTH ACTIVITY CONTAINING α-AMINOOXY CARBOXYLIC ACID ON THE N-TERMINAL MOIETY, AND A PROCESS FOR THE PREPARATION THEREOF

SPECIFICATION

This invention relates to novel peptides of ACTH activity containing α-aminooxy carboxylic acids on their N-terminal moieties, and to a process for the preparation of such compounds.

As is known, the peptide chain of adrenocorticotropic hormones (ACTH) can be modified to a great extent without the cessation of the adrenocorticotropic activity. Thus, e.g. more than one-third of the amino acid chain can be removed from the C-terminal part of the molecule without any decrease of the specific activity. Splitting of the further amino acids, however, leads to an abrupt fall of the activity. The peptide with the amino acid sequence 1–19 of ACTH possesses 30 percent of the activity of the original molecule, while the activity of the 1–16 ACTH fragment is only about 1 percent of that of the starting substance. On the other hand, the removal of the first amino acid from the N-terminal part of the molecule leads to an 50 percent decrease of the activity, E. Schroder, K. Lubke: The Peptides, Academic Press, New York, 1966, pp. 246 to 249.

The ACTH fragments, in which the N-terminal serine group is replaced by a D-amino acid, a non-natural amino acid or an acyl group obtained by omitting the functional groups of serine (e.g. β-hydroxypropionyl or propionyl group) sometime possess activities exceeding that of natural ACTH. This can be presumably attributed to the fact that these ACTH fragments of modified structures are resistant to the action of aminopeptidase-type enzymes, thus their decomposition rate in the organism is lower than that of the natural ACTH. Accordingly, these modified ACTH fragments show potent adrenocorticotropic activities also in those instances when the modifying group cannot entirely display the role of the N-terminal serine moiety of the natural hormone. Among these substituted ACTH peptides the D-serine derivatives (British Pat. Nos. 1,119,353 and 1,153,445), the sarcosine, β-alanine and α-aminobutyric acid derivatives (published German Pat. applications Nos. 2,055,151, 2,034,698, 2,144,300, 2,124,549 and 2,112,553), as well as the β-hydroxypropionyl and propionyl derivatives (French Pat. Nos. 1,513,943 and 1,513,944, British Pat. No. 1,153,594) have been described so far.

We have found that compounds of increased resistance against enzymatic activity can be obtained when replacing the N-terminal serine moiety of the ACTH molecule or of its fragments by an α-aminooxy acid. The L- and D-α-aminooxy-propionyl and L- and D-α-aminooxy-β-hydroxypropionyl derivatives proved to be particularly active. This fact is even more striking because although these aminooxy acids are structurally closely related to glycine, alanine and serine (the only difference is that the aminooxy acids contain an extra oxygen atom between the α-carbon atom and the amino group), their physico-chemical properties are completely different from those of the corresponding amino acids.

Accordingly, this invention relates to novel peptides of ACTH activities, having a complete ACTH sequence from the N-terminal amino acid at least to the sixteenth amino acid, but containing optionally other amino acids in the place of the individual amino acids of the ACTH sequence, and always containing an α-aminooxy acid in the place of the first amino acid. The invention relates further to the acid addition salts, derivatives and complexes of said peptides, as well as to a process for the preparation of such compounds.

The new compounds of the invention may be, for example, substituted peptides containing after the first aminooxy acid the 2–16 to 2–39 fragments of the natural ACTH molecule. In these substituted peptides the individual amino acids of the natural sequence may be replaced by other amino acids, provided that such a replacement does not cause a significant decrease in the ACTH activity. Thus, for example, the second amino acid (tyrosine) may be replaced by phenyl-alamine, and/or the third amino acid (serine) may be replaced by lycine, and/or the fourth amino acid (methionine) may be replaced by leucine, norvaline, norleucine or α-amino-butyric acid, and/or the fifth amino acid (glutaminic acid) may be replaced by glutamine, and/or the fifteenth and sixteenth amino acids (lysine) may be replaced by ornithine, and/or the seventeenth and eighteenth amino acids (arginines) may be replaced by lysine or ornithine. Such replacement possibilities exist first of all with regard to the 25–32 fragment, because even the natural ACTH molecules of different origin differ from each other in the sequence of this fragment. The most advantageous compounds with respect to their adrenocorticotropic activities are (L- or D-OSer$^1$, Asp$^{25}$, Ala$^{26}$, Gly$^{27}$)-α$^{1-28}$-ACTH and (D-OSer$^1$)-α$_h$$^{1-32}$-ACTH, wherein "OSer" represents the α-aminooxy-β-hydroxypropionic acid differing from serine only in the single oxygen atom between the α-carbon atom and the amino group. In the specification such abbreviations are used for the designation of the α-aminooxy acids having amino acid-like structures, thus, for example, OGly represents α-aminooxy acetic acid, OAla represents α-aminooxypropionic acid, etc.

The new peptides of ACTH activities, as well as their acid addition salts, derivatives and complexes can be prepared according to the invention starting from a protected peptide having a complete ACTH sequence from the N-terminal amino acid at least to the sixteenth amino acid, but containing optionally other α-amino acids in the place of the individual amino acids of the ACTH sequence, always containing an α-aminooxy acid in the place of the first amino acid and carrying protecting groups at least on the terminal aminooxy group and on the amino groups of the side chains and optionally also on the terminal carboxy group and on the carboxy groups of the side chains, deprotecting said peptide in one or more steps, and if desired, converting the obtained compound into its acid addition salts, derivatives or complexes.

The protected peptides used as starting substances according to the process of the invention can be prepared from the appropriate α-aminooxy acids and amino acids by fragment condensation or by the gradual introduction of the individual amino acids in the proper sequence. In these latter condensation processes the mixed anhydride method, the azide method, the active ester method or the DCC method can be used. The so-called solid phase synthesis can also be applied, according to which a peptide attached to a polymer on its terminal carboxy group is built up by coupling the C-terminal amino acid bound to the polymer with the amino acids and with the N-terminal α-aminoxy acid in the proper sequence.

The reactive groups which are not allowed to participate in the reaction are protected preferably by protecting groups which can be easily removed again e.g. by hydrolysis, acidolysis, hydrazinolysis or reduction. The carboxy group is preferably protected in the form of its methyl, tert.butyl, benzyl or p-chlorobenzyl ester or by converting it into an amide. The aminooxy and amino groups are protected preferably with tosyl, trityl, formyl, trifluoroacetyl, o-nitrosulfenyl, phthalyl, benzyloxycarbonyl, p-chlorobenzyloxycarbonyl, and, most preferably, tert. butoxycarbonyl groups. The guanidino group of the arginine moiety can be protected preferably with a nitro group, but this group can also be protected in protonated form. The imino group of hystidine can be protected with benzyl, trityl or dinitrophenyl groups. The hydroxy groups attached to the side chains can be protected optionally by ether formation, in this instance the tert.butyl and benzyl ethers are the most preferred ones.

By the proper selection of the protecting groups one may prepare compounds which can be deprotected either selectively or in a single step by methods known in the art (e.g. by hydrolysis, acidolysis, hydrazinolysis or reduction.)

According to a preferred method of the invention a protected α-aminooxy acid is condensed with a tripeptide methyl ester of the formula Tyr-Ser-Met-OCH$_3$, the obtained substituted peptide methyl ester is converted into its hydrazide and finally into the azide, and this azide is used for the acylation of a decapeptide of the formula Glu(OBut)-His-Phe-Arg-Trp-Gly-Lys(-BOC)-Pro-Val-Gly. The thus-obtained substituted tetradecapeptide is then condensed with the appropriately protected C-terminal fragment. Thus, for example, the substituted tetradecapeptide is condensed with the 15–16 dipeptide, 15–18 tetrapeptide, 15–28 tetradecapeptide, 15–32 octadecapeptide or 15–39 tetracosapeptide to yield the appropriately substituted hexadecapeptide, octadecapeptide, octacosapeptide, dotriacontapeptide or nonatriacontapeptide, respectively. In this condensation reaction the DCC or active ester coupling methods can be utilized with great advantages. In this latter method, particularly when a pentachlorophenyl or pentafluorophenyl ester is used, the active ester need not be prepared separately, but it can be formed directly in the reaction mixture from the substituted tetradecapeptide with pentachlorophenol or pentafluorophenol and DCC (see e.g. British Pat. No. 1,201,053).

The protected peptides always containing an α-aminooxy acid in position 1, used as starting compounds of the process of the invention, can also be prepared as follows: the appropriately protected C-terminal fragment is acylated with the protected 5–14 decapeptide, the N-terminal protecting group of the thus-obtained substituted peptide is removed, and the obtained substance is acylated with the appropriate substituted 1–4 tetrapeptide. In this way the tetrapeptide containing an α-aminooxy acid as N-terminal moiety can be converted directly into the protected peptide containing an N-terminal α-aminooxy acid, usable as starting substance in the process of the invention.

At the end of the synthesis the tert.butoxycarbonyl groups attached to the N-terminal α-aminooxy group and to the amino groups of the side chains, the tert. butyl-ester groups attached to the carboxy groups of the side chains, and, when not amidated, also to the C-terminal carboxy group, as well as the tert. butylether groups optionally attached to the hydroxy groups of the side chains are split off simultaneously by acidolysis, such as by trifluoroacetic acid treatment. The deprotected end-product can be purified by countercurrent distribution or by column chromatography, such as by ion exchange chromatography using different types of carboxymethyl celluloses.

The biological activities of the new compounds mentioned in the Examples supersede in some instances those of the respective ACTH fragments containing no α-aminooxy acid moieties. The evaluation was carried out by the Sayers-Saffran test.

Depending on the preparation methods and reaction conditions, the new compounds are obtained in the form of the free bases or as their salts. The salts can be converted into the free bases by methods well known in the art. On the other hand, the free bases can be converted into their pharmaceutically acceptable acid addition salts by contacting them with organic or mineral acids, e.g. hydrochloric, sulfuric, phosphoric, formic, acetic, lactic, tartaric, citric acids, higher fatty acids, etc.

The derivatives of the new compounds, falling also within the scope of the invention, are e.g. the esters, amides, N-substituted amides, first of all the peptide amides amidated at the C-terminal carboxy group and containing optionally free carboxy groups in the side chains.

The pharmaceutically usable complexes of the new peptides according to the invention are compounds formed by contacting the new peptides with certain organic or mineral substances ensuring prolonged activity to the peptides. Such organic compounds may be e.g. some types of gelatine, various carboxymethyl celluloses, alginates, polyphlorethynphosphate, polymeric amino acids or other polymers or copolymers. Among the mineral compounds some metal derivatives, first of all the hydroxides and the hardly soluble salts (e.g. phosphates or pyrophosphates) of zinc can be taken into account. In order to ensure a prolonged activity certain silicates can also be used, which form with the peptides insoluble complexes of hitherto unknown structures.

The new peptides and their salts, derivatives or complexes can be used in the therapy in the form of pharmaceutical products. Such pharmaceutical products may contain the active agents in combination with organic or mineral carriers suitable for enteral or parenteral administration. The pharmaceutical products may be e.g. solid liophilizates, wherein compounds inert to the peptides, such as mannitol, lactose or starch can be used as carriers. The suspensions or emulsions may contain besides the active ingredient and the carrier also inert preserving or stabilizing agents. The most advantageous pharmaceutical products contain the new peptides in the form of their complexes mentioned above, which ensure a prolonged activity to the product.

The pharmaceutical products may contain the active agents in amounts commonly used for adrenocorticotropic hormones, e.g. in a concentration of 0.5 to 5 mg./ml. These products can be administered 1 to 7 times a day by subcutaneous, intramuscular or parenteral route.

The invention is elucidated in detail by the aid of the following non-limiting Examples.

The abbreviations used in the Examples for the designation of the amino acid and peptide derivatives are those recommended by IUPAC-IUB (J. Biol. Chem., 247, 977 (1972). The α-aminooxy acids are marked by the OGly, OAla, OSer, symbols, as discussed above. If no other is indicated, these abbreviations relate to the L configuration, with the exception of Gly and OGly. The following other abbreviations were used in the Examples: PCPOH = pentachlorophenol, PFPOH = pentafluorophenol, DCC = dicyclohexyl carbodiimide, DCU = dicyclohexyl urea, BOC = tert. butoxycarbonyl, Bu$^t$ = tert. butyl, ONSu = N-succinimidyloxy, Z = carbobenzoxy.

The melting points were determined in a Dr. Tottoli-type apparatus (Buchli, Switzerland). The thin-layer chromatographic examinations were carried out on a "Silica-gel nach Stahl" adsorbent, using the following solvent mixtures:

1/ ethyl acetate:(pyridine:acetic acid:water = 20:6:11) = 8:2 2/ ethyl acetate:(pyridine:acetic acid:water = 20:6:11) = 6:4 3/ ethyl acetate:-pyridine:formic acid:water = 50:20:6:5.5 4/ chloroform:methanol = 98:2 5/ chloroform:methanol = 95:5

EXAMPLE 1

OGly-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asp-Ala-Gly-Glu 0.600 g. (0.143 mmoles) of BOC-OGly-Tyr-Ser-Met-Glu(OBu$^t$)-His-Phe-Arg-Trp-Gly-Lys(BOC)-Pro-Val-Gly-Lys-(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl are dissolved in a mixture of 4.8 ml. of trifluoroacetic acid, 0.6 ml. of water and 0.6 ml. of anisol, the solution is left to stand at room temperature for one hour, thereafter it is diluted with 60 ml. of ether. The separated pracipitate is filtered off, washed with ether and dried in vacuo over phosphorous pentoxide and potassium hydroxide. The trifluoroacetate of the respective substituted octacosapeptide is obtained with a yield of 0.538 g. (87%).

The thus obtained crude trifluoroacetate compound is dissolved in 10 ml. of water, and the trifluoroacetate ions are exchanged for acetate ions using a Dowex 1×8 ion exchanger in the acetate form. The obtained solution, containing now the acetate of the substituted octacosapeptide is poured onto a column of Whatman CM-52 ion exchanger, and the substance is eluted with a linear buffer gradient solution prepared from 0.01 molar (pH = 4.5) and 0.4 molar (pH = 6.7) ammonium acetate buffers. The appropriate fractions are combined and freeze-dried. 0.22 g. (34%) of the respective octacosapeptide are obtained, having the following analytical data: peptide content: 72–3 % (on the basis of UV absorption), Met-sulfoxide content: 1.3 %; Tyr/Trp ratio: 2.05.

Amino acid analysis (theoretical values in brackets): Lys: 4.05 (4); His: .93 (1); Arg: 3.08 (3); Ser: 0.79 (1), Glu: 2.01 (2), Pro: 3.09 (3), Gly: 3.04 (3), Ala: 0.92 (1), Val: 3.12 (3), Met: 0.60 (1), Tyr: 1.88 (2), Phe: 0.85 (1).

The protected substituted octacosapeptide trihydrochloride, used as starting substance, is prepared as follows:

Step 1 tert.Butoxycarbonyl-aminooxyacetic acid (BOC-OGly)

316.0 g. (2.37 moles) of tert.butoxycarbonyl-hydroxylamine are dissolved in 2680 ml. of ethanol, and 207.8 g. (5.19 moles) of sodium hydroxide and 350.4 g. (2.52 moles) of monobromacetic acid are added to the solution with cooling. The reaction mixture is refluxed for 20 minutes, thereafter the solvent is distilled off. The residue is dissolved in 1940 ml. of water, and the solution is acidified to pH = 3 with concentrated hydrochloric acid. The mixture is cooled and stirred for 2 hours, then the separated crystals are filtered off, the the crude product, weighing 419 g., is crystallized from a mixture of chloroform and n-hexane. This way 388.8 g. (86%) of tert. butoxycarbonyl-aminooxyacetic acid are obtained; m.p.: 115°–116°C.

Analysis:
Calculated for $C_7H_{13}NO_5$(191.18):
C: 44.0%; H: 6.8%; N: 7.2%.
Found: C: 43.9%; H: 6.9%; N: 7.1%.

Step 2

BOC-OGly-Tyr-Ser-Met-$N_2H_3$ 1.72 g. (9.0 mmoles) of BOC-OGly and 4.50 g. (10 mmoles) of Tyr-Ser-Met-OCH$_3$.HCl are dissolved in 10 ml. of dimethyl formamide. The solution is cooled to 0°C, and 1.11 ml. 10 mmoles of N-methyl-morpholine and 1.85 g. (9.0 mmoles) of DCC are added. The reaction mixture is stirred for 1 hour at 0°C, thereafter the mixture is left to stand at room temperature overnight. The separated DCU is filtered off, the filtrate is evaporated, and the residue is dissolved in 200 ml. of ethyl acetate. The solution is washed with 2 × 100 ml. of n hydrochloric acid and 2 × 100 ml. of 8 percent aqueous sodium hydrocarbonate solution, dried and evaporated. The obtained 4.5 g. of crude substituted protected tetrapeptide methyl ester are dissolved in 45 ml. of methanol, 1.26 ml. (26.0 mmoles) of hydrazine hydrate are added to the solution, and the mixture is left to stand at room temperature overnight. Thereafter the solution is evaporated, and the residue is triturated with ethyl acetate. The solids are filtered off, washed with ethyl acetate and ether, and dried over concentrated sulfuric acid. 3.30 g. (62.5%) of the appropriate substituted protected tetrapeptide hydrazide are obtained. M.p.: 137°C (recrystallized from water); $R_f^1$ = 0.36.

Analysis:
Calculated for $C_{24}H_{38}N_6O_9S$ (586.66):
C: 49.1%; H: 6.5%; N: 14.4%.
Found: C: 49.0%; H: 6.6%; N: 14.4%.

Step 3

BOC-OGly-Tyr-Ser-Met-Glu(OBu$^t$)-His-Phe-Arg-Trp-Gly-Lys(BOC)-Pro-Val-Gly.HCl.

0.41 g. (0.70 mmoles) of BOC-OGly-Tyr-Ser-Met-$N_2H_3$ are dissolved in 5 ml. of dimethyl formamide. The solution is cooled to −20°C, and 0.64 ml. (2.8 mmoles) of 4.4 n ethylacetate hydrochloric acid are added dropwise, followed by 0.105 ml. (0.85 mmoles) of tert..butylnitrite. The reaction mixture is stirred at −10°C for 5 minutes, cooled again to −20°C, and a solution of 0.96 g. (0.70 mmoles) of Glu(OBu$^t$)-His-Phe-Arg-Trp-Gly-Lys(BOC)-Pro-Val-Gly (see British Pat. No. 1,201,053) and 0.48 ml. (2.8 mmoles) of diisopropyl ethylamine in 8 ml. of dimethylformamide is added. The reaction mixture is stirred at −5 to 0°C for 1 hour, left to stand at 0°C overnight, and evaporated to dryness. The residue is triturated with 8% aqueous sodium hydrocarbonate solution, the solids are filtered off, washed with water and dried. The obtained 0.93 g. (69%) of substituted protected tetradecapeptide are suspended in 6 ml. of methanol, and a mixture of 1.35 ml. of pyridine and 1.35 ml. of cc. hydrochloric acid is added to the suspension. The obtained solution is diluted with 50 ml. of water, the separated substituted protected tetradecapeptide hydrochloride is filtered off, washed with water and dried. 0.78 g. (57%) of the aimed product are obtained, m.p.: 202°–204°C, R$_f^2$ = 0.18. Empirical formula: C$_{90}$H$_{132}$N$_{21}$O$_{24}$ClS (M = 1959.66).

Step 4

BOC-OGly-Tyr-Ser-Met-Glu(OBu$^t$)-His-Phe-Arg-Trp-Gly-Lys(BOC)-Pro-Val-Gly-Lys(BOC)-Lys(Boc)-Arg-Arg-Pro-Val-Lys(BOC)-Val-Tyr(Bu$^t$)-Pro-Asp-(OBu$^t$)-Ala-Gly-Glu(OBu$^t$)-OBu$^t$.3HCl 0.345 g. (0.176 mmoles) of BOC-OGly-Tyr-Ser-Met-Glu(OBu$^t$)-His-Phe-Arg-Trp-Gly-Lys(BOC)-Pro-Val-Gly-HCl, 0.400 g. (0.176 mmoles) of Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$·3HCl (see British Pat. No. 1,201,053) and 0.281 g. (1.05 mmoles) of PCPOH are dissolved in 3.3 ml. of dimethylformamide, and 0.025 ml. (0.18 mmoles) of triethylamine and 0.074 g. (0.36 mmoles) of DCC are added to the solution. The reaction mixture is left to stand at room temperature for 2 days, thereafter the separated DCU is filtered off, and the filtrate is diluted with 30 ml. of ether. The separated solids are collected by filtration, washed with ether, and dried. 0.640 g. (87%) of the title compound are obtained; m.p.: 208°–212°C, R$_f^3$ = 0.22. Empirical formula C$_{194}$H$_{311}$N$_{44}$O$_{49}$Cl$_3$S (M = 4182.29).

EXAMPLE 2

OAla-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asp-Ala-Gly-Glu 0.600 g. (0.142 mmoles) of BOC-OAla-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl are dissolved in a mixture of 4.8 ml. of trifluoroacetic acid, 0.6 ml. of water and 0.6 ml. of anisol. The solution is left to stand at room temperature for 1 hour, then it is diluted with 60 ml. of ether. The separated precipitate is filtered off, washed with ether and dried in vacuo over phosphorous pentoxide and potassium hydroxide. 0.532 g. (86.5%) of the substituted octacosapeptide-trifluoroacetate are obtained.

The above crude trifluoroacetate compound is dissolved in 10 ml. of water, and the trifluoroacetate ions are changed for acetate ions using a Dowex 1×8 ion exchanger in acetate form. The obtained solution, containing now the acetate of the substituted octacosapeptide, is poured onto a Whatman CM-52 ion exchanger column, and eluted with a linear buffer gradient using 0.01 molar (pH = 4.5) and 0.4 molar (pH = 6.7) ammonium acetate buffers. The fractions containing the aimed product are combined and freeze-dried. 0.23 g. (42%) of the title compound are obtained, the analytical data of which are as follows: peptide content: 85.1 percent (on the basis of UV absorption); Met-sulfoxide content: 2.7 percent, Tyr/Trp ratio: 2.10. Amino acid analysis (theoretical values in brackets): Lys: 3.89 (4), His: 0.97 (1), Arg: 3.00 (3), Asp: 1.10 (1), Ser: 0.97 (1), Glu: 1.94 (2), Pro: 3.10 (3), Gly: 3.06 (3), Ala: 1.15 (1), Val: 2.84 (3), Met: 0.68 (1), Tyr: 1.94 (2), Phe: 1.06 (1).

The protected substituted octacosapeptide trihydrochloride used as starting substance is prepared as follows:

Step 1 tert.butoxycarbonyl-1-α-aminooxy-propionic acid (BOC-OAla)

4.0 g. (29 mmoles) of D-α-bromopropionic acid are reacted with 3.62 g. (65 mmoles) of potassium hydroxide and 4.39 g. (33 mmoles) of tert.butoxycarbonylhydroxylamine as described in Example 1, Step 1. The reaction mixture is processed as indicated in the same example. The obtained crude product is dissolved in ether, and 6.3 ml. (32 mmoles) of dicyclohexylamine are added. This way 6.7 g. (60%) of tert.butoxycarbonyl-L-α-aminooxypropionic acid dicyclohexylamine salt are obtained, m.p.: 157°C. This salt is suspended in ether, the suspension is shaken with 0.2 n sulfuric acid, and the etheral layer is evaporated. 3.05 g. (50%) of the title compound are obtained, m.p.: 110°–112°C [α]$_D^{30}$ = −91° (c = 1, in ethanol).

Analysis:
Calculated for C$_8$H$_{15}$NO$_5$ (M = 205.21):
C: 46.4%; H: 7.4%; N: 6.8%.
Found: C: 46.6%; H: 7.5%; N: 6.8%.

Step 2 BOC-OAla-Tyr-Ser-Met-N$_2$H$_3$ 1.44 g. (7.0 mmoles) of BOC-OAla and 3.50 g. (7.8 mmoles) of Tyr-Ser-Met-OCH$_3$-HCl are dissolved in 12 ml. of dimethyl formamide. The solution is cooled to 0°C, and 0.85 ml, (7.8 mmoles) of N-methylmorpholine and 1.48 g. (7.2 mmoles) of DCC are added. The mixture is stirred at 0°C for 1 hour, and thereafter left to stand at room temperature overnight. Next day methanol is distilled off, the residue is triturated with ethyl acetate. The separated solids are filtered off, washed with ethyl acetate and ether, and dried over concentrated sulfuric acid. 2.1 g. (50%) of the title compound are obtained; m.p.: 147°C (recrystallized from water), R$_f^1$ = 0.43.

Analysis:
Calculated for C$_{25}$H$_{40}$N$_6$O$_9$S (M = 600.69):
C: 50.0%; H: 6.7%.
Found: C: 49.6%; H: 6.7%.

Step 3

BOC-OAla-Tyr-Ser-Met-Glu(OBu$^t$)-His-Phe-Arg-Trp-Gly-Lys(BOC)-Pro-Val-Gly.HCl 0.266 g. (0.44 mmoles) of BOC-OAla-Tyr-Ser-Met-N$_2$H$_3$ are dissolved in 3.2 ml. of dimethyl formamide. The solution is cooled to −20°C, and 0.41 ml. (1.8 mmoles) of 4.4 n ethyl acetate hydrochloric acid and 0.07 ml. (0.59 mmoles) of tert. butyl nitrite are added dropwise to the stirred solution. The reaction mixture is stirred for 5 minutes at −10°C, cooled to −20°C, and a solution of 0.600 g. of (0.438 mmoles) of Glu(OBu$^t$)-His-Phe-Arg-Trp-Gly-Lys(BOC)-Pro-Val-Gly and 0.31 ml. (1.8 mmoles) of diisopropylethylamine in 5 ml. of dimethyl formamide is added. The reaction mixture is stirred for 1 hour at −5 to 0°C, and left to stand at 0°C overnight. Next day dimethyl formamide is distilled off and the residue is triturated with a 8 percent aqueous sodium hydrocarbonate solution. The solids are filtered off, washed with water and dried. The obtained 0.70 g. (81%) of protected substitued tetradecapeptide are suspended in 5 ml. of methanol, and a mixture of 1 ml. of cc. hydrochloric acid and 1 ml. of pyridine is added to the suspension. The obtained solution is diluted with 50 ml. of water, the separated precipitate is filtered off, washed with water and dried. 0.513 g. (59.5%) of the title compound are obtained; m.p.: 200°–202°C, $R_f^2$ = 0.19. Empirical formula: $C_{91}H_{134}N_{21}O_{24}ClS$ (1973.68).

Step 4

BOC-OAla-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl.

0.348 g. (0.176 mmoles) of BOC-OAla-Tyr-Ser-Met-Glu(OBu$^t$)-His-Phe-Arg-Trp-Gly-Lys(BOC)-Pro-Val-Gly.HCl, 0.400 g. (0.176 mmoles) of Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl and 0.281 g. (1.05 mmoles) of PCPOH are dissolved in 3.3 ml. of dimethyl formamide, and 0.025 ml. (0.18 mmoles) of triethyl amine and 0.074 g. (0.36 mmoles) of DCC are added to the solution. The mixture is left to stand at room temperature for 2 days, the separated DCU is filtered off, and the filtrate is diluted with 30 ml. of ether. The separated product is filtered off, washed with ether and dried. 0.658 g. (89%) of the title compound are obtained; m.p.: 175°–177°C, $R_f^3$ = 0.25. Empirical formula: $C_{195}H_{313}N_{44}O_{49}Cl_3S$ (4196.36).

EXAMPLE 3

D-OAla-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asp-Ala-Gly-Glu 0.600 g. (0.142 mmoles) of BOC-D-OAla-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl are dissolved in a mixture of 4.8 ml. of trifluoro acetic acid, 0.6 ml. of water and 0.6 ml. of anisol. The mixture is left to stand at room temperature for 1 hour, thereafter diluted with 60 ml. of ether. The separated precipitate is filtered off, washed with ether, and dried in vacuo over phosphorous pentoxide and potassium hydroxide. 0.546 g. (88.5%) of substituted octacosapeptide trifluoro acetate are obtained. Tyr/Irp The obtained crude trifluoroacetate is dissolved in 10 ml. of water, and the trifluoroacetate ions are exchanged for acetate ions using a Dowex 1×8 ion exchanger in the acetate form. The obtained solution, containing now the acetate of the substituted octacosapeptide, is poured onto a Whatman CM-52 ion exchanger column, and eluted with a linear buffer gradient using 0.01 molar (pH 4.5) and 0.4 molar (pH 6.7) ammonium acetate buffers. The fractions containing the aimed product are combined and freeze-dried. 0.245 g. (39%) of the title compound are obtained, having the following analytical data: peptide content: 75% (on the basis of UV absorption); Met-sulfoxide content: 2.57%; Tyr/Irp ratio: 2.07.

Amino acid analysis (theoretical values in brackets): Lys: 4.35 (4), His: 0.97 (1), Arg: 3.13 (3), Asp: 1.06 (1), Ser: 1.00 (1), Glu: 1.92 (2), Pro: 2.90 (3), Gly: 3.00 (3), Ala: 1.00 (1), Val: 2.92 (3), Met: 0.87 (1), Tyr: 2.21 (2), Phe: 1.06 (1).

The protected substituted octacosapeptide trihydrochloride used as starting substance is prepared as follows:

Step 1 tert.butoxycarbonyl-D-α-aminooxypropionic acid (BOC-D-OAla)

7.04 g. (51 mmoles) of L-α-bromoropionic acid are reacted with 6.3 g. (112 mmoles) of potassium hydroxide and 7.71 g. (58 mmoles) of tert.butoxycarbonyl-hydroxylamine as described in Example 1, Step 1. The reaction mixture is processed as indicated in the same example. The crude product is dissolved in ether, and 11.0 ml. (56 mmoles) of dicyclohexylamine are added. This way 14.85 g. (75 %) of tert.butoxycarbonyl-D-α-bromopropionic acid dicyclohexylamine salt are obtained; m.p.: 157°C. This salt is suspended in ether, the suspension is shaken with 0.2 n sulfuric acid, and the etheral phase is evaporated. 6.55 g. (62 %) of the title compound are obtained; m.p.: 110°–111°C. $[\alpha]_D^{25}$ = +90.0° (c = 1, in ethanol). Empirical formula: $C_8H_{15}NO_5$ (205.21).

Step 2 BOC-D-OAla-Tyr-Ser-Met-N$_2$H$_3$ 1.85 g. (9.0 mmoles) of BOC-D-OAla and 4.50 g. (10 mmoles) of Tyr-Ser-Met-OCH$_3$.HCl are dissolved in 15 ml. of dimethyl formamide. The solution is cooled to 0°C, and 1.11 ml. (10 mmoles) of N-methylmorpholine and 1.90 g. (9.2 mmoles) of DCC are added. The reaction mixture is stirred at 0°C for 1 hour, then left to stand at room temperature overnight. Thereafter the separated DCU is filtered off, the filtrate is evaporated and the residue is dissolved in 200 ml. of ethyl acetate. This solution is shaken with 2×100 ml. of n hydrochloric acid and 2×100 ml. of 8 percent aqueous sodium hydrocarbonate solution, dried and evaporated. The obtained 3.65 g. of gelly residue are dissolved in 40 ml. of methanol, 1.02 ml. (21.2 mmoles) of hydrazine hydrate are added, and the mixture is left to stand at room temperature overnight. Next day methanol is distilled off from the separated gelly substance, the residue is triturated with ethyl acetate, the solids are collected by filtration, washed with ethyl acetate and ether, and dried over cc. sulfuric acid. 1.90 g. (35%) of the title compound are obtained; m.p.: 184°–185°C (recrystallized from water), $R_f^1$ = 0.43.

Analysis:
Calculated for $C_{25}H_{40}N_6O_9S$ (600.69):
C: 50.0%; H: 6.7%; N: 14.0%.
Found: C: 49.8%; H: 6.68%; N: 14.1%.

Step 3
BOC-D-OAla-Tyr-Ser-Met-Glu(OBu$^t$)-His-Phe-Arg-Trp-Gly-Lys(BOC)-Pro-Val-Gly.HCl 0.381 g. (0.635 mmoles) of BOC-D-OAla-Tyr-Ser-Met-N$_2$H$_3$ are dissolved in 4.5 ml. of dimethyl formamide. The solution is cooled to −20°C, and 0.58 ml. (2.65 mmoles) of 4.4 n ethyl acetate hydrochloric acid and 0.095 ml. (0.80 mmoles) of tert. butylnitrite are added dropwise, while stirring. The reaction mixture is stirred at −10°C for 5 minutes, cooled again to −20°C and a solution of 0.86 g. (0.628 mmoles) of Glu(OBu$^t$)-His-Phe-Arg-Trp-Gly-Lys(BOC)-Pro-Val-Gly and 0.43 ml. (2.50 mmoles) of diisopropyl ethylamine in 7.2 ml. of dimethyl formamide is added. The reaction mixture is stirred at −5° to 0°C for 1 hour, and left to stand at 0°C overnight. Next day dimethyl formamide is distilled off, and the residue is triturated with 8 percent aqueous sodium hydrocarbonate solution. The solids are filtered off, washed with water, and dried. The obtained 0.95 g. (77%) of protected substituted tetradecapeptide are suspended in 6 ml. of methanol, and a mixture of 1.35 ml. of cc. hydrochloric acid and 1.35 ml. of pyridine is added to the suspension. The obtained solution is diluted with 50 ml. of water, the separated precipitate is filtered off, washed with water, and dried. 0.78 g. (63%) of the title compound are obtained; m.p.: 204°–210°C, $R_f{}^2$ = 0.20, empirical formula: $C_{91}H_{134}N_{21}O_{24}·ClS$ (1973.68).

Step 4 BOC-D-OAla-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$OBu$^t$. 3HCl 0.348 g. (0.176 mmoles) of BOC-D-OAla-Tyr-Ser-Met-Glu(OBu$^t$)-His-Phe-Arg-Trp-Gly-Lys(BOC)-Pro-Val-Gly. .HCl, 0.400 g. (0.176 mmoles) of Lys(BOC)-Lys(BOC)-Arg-Arg-Pro-Val-Lys(BOC)-Val-Tyr(Bu$^t$)-Pro-Asp(OBu$^t$)-Ala-Gly-Glu(OBu$^t$)-OBu$^t$.3HCl and 0.281 g. (1.05 mmoles)of PCPOH are dissolved in 3.3 ml. of dimethyl formamide, and 0.025 ml. (0.18 mmoles) of triethyl amine then 0.074 g. (0.36 mmoles) of DDC are added to the solution. The reaction mixture is left to stand at room temperature for 2 days, thereafter the separated DCU is filtered off, and the filtrate is diluted with 30 ml. of ether. The precipitated product is filtered off, washed with ether, and dried. 0.647 g. (87.5%) of the title compound are obtained, m.p.: 166°–167°C, $R_f{}^3$ = 0.25, empirical formula: $C_{195}H_{313}N_{44}O_{49}Cl_3S$ (4196.32).

EXAMPLE 4

OSer-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asp-Ala-Gly-Glu 0.600 g. (0.142 mmoles) of BOC-OSer-Tyr-Ser-Met-Glu(OBu$^t$)-His-Phe-Arg-Trp-Lys-Lys(BOC)-Pro-Val-Gly-Lys- (BOC)-Lys(BOC)-Arg-Arg-Pro-Val-Lys(BOC)-Val-Tyr(BU$^t$)-Pro-Asp(OBu$^t$)-Ala-Gly-Glu(OBu$^t$)-OBu$^t$.3HCl are dissolved in a mixture of 4.8 ml. of trifluoroacetic acid, 0.6 ml. of water and 0.6 ml. of anisol. The mixture is left to stand at room temperature for 1 hour, thereafter it is diluted with 60 ml. of ether. The separated precipitate is filtered off, washed with ether, and dried in vacuo over phosphorous pentoxide and potassium hydroxide. 0.400 g. (65%) of substituted octacospeptide trifluoroacetate are obtained.

The obtained crude trifluoroacetate is dissolved in 8 ml. of water, and the trifluoroacetate ions are exchanged for acetate ions using a Dowex 1×8 ion exchanger in the acetate form. The thus-obtained solution, containing now the acetate of the substituted octacosapeptide, is poured onto a Whatman CM-52 ion exchanger column, and eluted with a linear buffer gradient using 0.01 molar (pH 4.5) and 0.4 molar (pH 6.7) ammonium acetate buffers. The fractions containing the aimed product are collected and freeze-dried. 0.240 g. (41.5%) of the title compound are obtained, having the following analytical data: peptide content: 81.6 percent (on the basis of UV absorption); Metsulfoxide content: 4.4 percent, Tyr/Trp ratio: 2.13. Amino acid analysis (theoretical values in brackets): Lys: 3.92 (4), His: 1.00 (1), Arg: 3.15 (3), Asp: 0.99 (1), Ser: 0.83 (1), Glu: 1.94 (2), Pro: 3.00 (3), Gly: 3.05 (3), Ala: 1.04 (1), Val: 2.92 (3), Met: 0.79 (1), Tyr: 1.83 (2), Phe: 0.97 (1).

The protected substituted octacosapeptide trihydrochloride, used as starting substance is prepared as follows:

Step 1 tert.
Butoxycarbonyl-L-α-aminooxy-β-benzyloxy propionic acid 48.4 g. (0.364 moles) of tert. butoxycarbonylhydroxylamine, 40.7 g. (0.728 moles) of potassium hydroxide and 94.0 g. (0.364 moles) of DL-α-bromo-βbenzyloxypropionic acid are dissolved in 360 ml. of water, and the reaction mixture is stirred at room temperature for 3 hours. Thereafter the pH of the solution is adjusted to 3, and the acidic mixture is extracted with 3 × 720 ml. of ether. The etheral solution is washed with 720 ml. of water, dried, and 78 ml. (0.40 moles) of dicyclohexylamine are added to the dry solution. The obtained 43.61 g. of tert.butoxycarbonyl-DL-α-aminooxy-β-benzyloxypropionic acid dicyclohexylamine salt m.p.: 144°–146°C are suspended in 500 ml. of ether, and the suspension is shaken with 5 × 100 ml. of 0.2 n sulfuric acid. The etheral solution is dried and evaporated to dryness. The residue is dissolved in 700 ml. of ethanol, and 6.56 g. (48.5 mmoles) of (+)-amphetamine base are added to the solution. The mixture is cooled overnight, thereafter the separated crystals are filtered off. The mother liquor is evaporated to yield 9.33 g. (16.5%) of the title compound, m.p.: 95°–97°C, $[\alpha]_D{}^{28}$ = −36° (c = 1, in ethanol). Empirical formula: $C_{15}H_{21}NO_6$ (311.34).

Step 2
tert.Butoxycarbonyl-L-α-aminooxy-β-hydroxypropionic acid (BOC-OSer).

5.0 g. 16.1 mmoles of L-α-tert.butoxycarbonyl-aminooxy-β-benzyloxypropionic acid are dissolved in 100 ml. of methanol, and the solution is hydrogenated in the presence of 2.5 g. of 10 percent palladium-on-carbon catalyst. After 3 hours of reaction the catalyst is filtered off, and the filtrate is evaporated. The oily residue is covered with petroleum ether, and left to stand for several hours. The separated crystalline substance is filtered off and dried. 3.2 g (90%) of the title compound are obtained; m.p.: 94°–95°C, $R_f{}^1$ = 0.27, empirical formula: $C_8H_{15}NO_6$ (221.22).

Step 3 BOC-OSer-Tyr-Ser-Met-N$_2$H$_3$ 2.2 g. (10 mmoles) of BOC-OSer- and 4.50 g. (10 mmoles) of Tyr-Ser-Met-OCH$_3$.HCl are dissolved in 15 ml. of dimethyl formamide. The solution is cooled to 0°C, and 1.11 ml. (10 mmoles) of N-methylmorpholine and then 1.90 g. (9.2 mmoles) of DCC are added. The reaction mixture is stirred at 0°C for 1 hour and left to stand at room temperature overnight. The separated DCU is filtered off, and the filtrate is evaporated. The residue is dissolved in 200 ml. of ethyl acetate. The solution is washed with 2 × 100 ml. of n hydrochloric acid and 2 × 100 ml. of 8 percent aqueous sodium hydrocarbonate solution, dried and evaporated. The 3.7 g. of protected substituted tetrapeptide ester, obtained as a residue, are dissolved in 40 ml. of methanol, 1.0 ml. (20.4 mmoles) of hydrazine hydrate are added, and the mixture is left to stand at room temperature overnight. Next day methanol is distilled off, and the residue is triturated with ethyl acetate. The separated solids are filtered off, washed with ethyl acetate and ether, and dried over cc. sulfuric acid. 2.5 g. (44%) of the title compound are obtained; m.p.: 141°C, $r_f^1 = 0.30$.

Analysis:
Calculated for $C_{25}H_{40}N_6O_{10}S$ (616.69):
C: 48.7%; H: 6.55%; N: 13.6%.
Found: C: 48.3%; H: 6.7%; N: 13.3%.

step 4
BOC-OSer-Tyr-Ser-Met-Glu(OBu')-His-Phe-Arg-Trp-Gly-Lys(BOC)-Pro-Val-Gly-.HCl 0.274 g. (0.446 mmoles) of BOC-OSer-Tyr-Ser-Met-$N_2H_3$ are dissolved in 3.2 ml. of dimethyl formamide. The solution is cooled to −20°C, and 0.41 ml. (1.8 mmoles) of 4.4 n ethylacetate hydrochloric acid and then 0.07 ml. (0.59 mmoles) of tert.butylnitrite are added dropwise, with stirring. The reaction mixture is stirred for 5 minutes at −10°C, cooled again to −20°C, and a solution of 0.600 g. 0.438 mmoles of Glu OBu' -His-Phe-Arg-Trp-Gly-Lys BOC -Pro-Val-Gly and 0.31 ml. (1.8 mmoles) of diisopropyl-ethylamine in 5 ml. of dimethyl formamide is added. The reaction mixture is stirred at −5° to 0°C for 1 hour, and left to stand at 0°C overnight. Next day the solution is evaporated, and the residue is triturated with 8 percent aqueous sodium hydrocarbonate solution. The solids are filtered off, washed with water, and dried. The obtained 0.69 g. (79%) of protected substituted tetradecapeptide are suspended in 5 ml. of metnaol, and a mixture of 1 ml. of cc. hydrochloric acid and 1 ml. of pyridine is added to the suspension. The obtained solution is diluted with 50 ml. of water, and the separated precipitate is filtered off, washed with water, and dried. 0.471 g. (54%) of the title compound are obtained, m.p.: 198°–202°C, $R_f^2 = 0.16$, empirical formula: $C_{91}H_{134}N_{21}O_{25}ClS$ (1989.68).

Step 5
BOC-OSer-Tyr-Ser-Met-Glu(OBu')-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu')-Pro-Asp(OBu')-Ala-Gly-Glu(OBu')-OBu'.3HCl 0.350 g. (0.176 mmoles) of BOC-OSer-Tyr-Ser-Mat-Glu(OBu')-His-Phe-Arg-Trp-Gly-Lys(BOC)-Pro-Val-Gly.HCl, 0.400 g. (0.176 mmoles) of Lys(BOC)-Lys(BOC)-Arg-Arg-Pro-Val-Lys(BOC)-Val-Tyr(Bu')-Pro-Asp(OBu')-Ala-Gly-Glu(OBu')-OBu'.3HCl and 0.281 g. (1.05 mmoles) of PCPOH are dissolved in 3.3 ml. of dimethyl formamide, and 0.025 ml. (0.18 mmoles) of triethylamine and then 0.074 g. (0.36 mmoles) of DCC are added to the solution. The reaction mixture is left to stand at room temperature for 2 days, thereafter DCU is filtered off, and the filtrate is diluted with 30 ml. of ether. The separated product is filtered off, washed with ether, and dried. 0.659 g. (88.5%) of the title compound are obtained; m.p.: 160°–166°C, $R_f^3 = 0.22$, empirical formula: $C_{195}H_{313}N_{44}O_{50}Cl_3S$ (4212.33).

EXAMPLE 5
D-OSer-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asp-Ala-Gly- 0.600 g. (0.142 mmoles) of BOC-D-OSer-Tyr-Ser-Met-Glu(OBu')-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu')-Pro-Asp(OBu')-Ala-Gly-Glu(OBu')-OBu')-Pro-Arp(OBu')-Ala-Gly-Glu(OBu')-OBu'.3HCl are dissolved in a mixture of 4.8 ml. of trifluoroacetic acid, 0.6 ml. of water and 0.6 ml. of anisol. The solution is left to stand at room temperature for 1 hour, thereafter it is diluted with 60 ml. of ether. The separated precipitate is filtered off, washed with ether, and dried in vacuo over phosphorous pentoxide and potassium hydroxide. 0.533 g. (86.5%) of the substituted octacosapeptide trifluoroacetate are obtained.

The obtained trifluoroacetate is dissolved in 10 ml. of water, and the trifluoroacetate ions are exchanged for acetate ions using a Dowex 1×8 ion exchanger in the acetate form. The thus-obtained solution, containing now the acetate salt of the substituted octacosapeptide, is poured onto a Whatman CM-52 ion exchanger column, and eluted with a linear buffer gradient using 0.01 molar (pH 4.5) and 0.4 molar (pH 6.7) ammonium acetate buffers. The fractions containing the aimed product are collected and freeze-dried. 0.250 g. (43%) of the title compound are obtained, having the following analytical data: Peptide content: 81.0 percent (on the basis of UV absorption), Metsulfoxide content: 4,4 percent, Tyr/Trp ratio: 2.05, amino acid analysis (theoretical values in brackets): Lys: 3.76 (4), His: 0.8 (1), Arg: 3.05 (3), Asp: 1.00 (1), Ser: 0.73 (1), Glu: 1.94 (2), Pro: 3.00 (3), Gly: 2.95 (3), Ala: 1.05 (1), Val: 2.82 (3), Met: 0.78 (1), Tyr: 1.6 (2), Phe: 0.83 (1).

The protected substituted octacosapeptide trihydrochloride, used as starting substance, is prepared as follows:

Step 1
tert.Butoxycarbonyl-D-α-aminooxy-β-benzyloxy-propionic acid

The tert. butoxycarbonyl-D-α-aminooxy-β-benzyloxy-propionic acid (+)- amphetamine salt, obtained as described in Example 4, Step 1, is recrystallized from ethanol. 13.27 g. of pure substance are obtained, m.p.: 188°–191°C, $[\alpha]_D^{26} = +54°$ (c = 0.5, in methanol). Upon decomposing the salt 7.9 g. (14%) of tert. butoxycarbonyl-D-α-aminooxy-β-benzyloxy-propionic acid are obtained, m.p.: 96°–98°C, $[\alpha]_D^{30} = +38°$ (c = 1, in ethanol).

Step 2
tert.Butoxycarbonyl-D-α-aminooxy-β-hydroxy-propionic acid (BOC-D-OSer)

5.5 g. (17.7 mmoles) of D-α-tert.butoxycarbonyl-aminoxy-β-benzyloxy propionic acid are dissolved in 110 ml. of methanol, and the solution is hydrogenated in the presence of 2.75 g. of 10 percent palladium-on-carbon catalyst. After 3 hours of reaction the catalyst is filtered off, the filtrate is evaporated, and the oily residue is covered with petroleum ether. After several hours of standing the crystalline substance is filtered off, and dried. 3.65 g. (96%) of D-α-tert.butoxycarbonyl-aminooxy-β-hydroxypropionic acid are obtained, m.p.: 94°–95°C, $R_f^1$: 0.27. Empirical formula: $C_8H_{15}NO_6$ (221.22).

Step 3 BOC-D-OSer-Tyr-Ser-Met-N$_2$H$_3$ 4.4 g. (20 mmoles) of BOC-D-OSer and 9.0 g. (20 mmoles) of Tyr-Ser-Met-OCH$_3$ are dissolved in 30 ml. of dimethyl formamide. The solution is cooled to 0°C, and 2.22 ml. (20 mmoles) of N-methyl morpholine and then 3.8 g. (18.4 mmoles) of DOC are added. The reaction mixture is stirred at 0°C for one hour, and then left to stand at room temperature overnight. The separated DCU is filtered off, the filtrate is evaporated, and the residue is dissolved in 400 ml. of ethyl acetate. The solution is washed with 2×200 ml. of n hydrochloric acid and 2×200 ml. of 8 percent aqueous sodium hydrocarbonate solution, dried and evaporated. The 8.10 g. of protected substituted tetrapeptide ester, obtained as a residue, are dissolved in 85 ml. of methanol, 2.2 ml. (46 mmoles) of hydrazine hydrate are added, and the mixture is left to stand at room temperature overnight. Next day methanol is distilled off, the residue is triturated with ethyl acetate, the separated solids are filtered off, washed with ethyl acetate and ether, and dried over cc. sulfuric acid. 7.21 g. (63%) of the title compound are obtained, m.p.: 174°–175°C (recrystallized from water), $R_f^1 = 0.30$.

Analysis:
Calculated for $C_{25}H_{40}N_6O_{10}S$ (616.69):
C: 48.7%; H: 6.55%; N: 13.6%.
Found: C: 48.3%; H: 6.6%; N: 13.8%.

Step 4
BOC-D-OSer-Tyr-Ser-Met-Glu(OBu$^t$)-His-Phe-Arg-Trp-Gly-Lys(BOC)-Pro-Val-Gly.HCl 1.25 g. (2.13 mmoles) of BOC-D-OSer-Tyr-Ser-Met-N$_2$H$_3$ are dissolved in 15 ml. of dimetyl formamide. The solution is cooled to −20°C, and 2.08 ml. (8.32 mmoles) of 4 n ethyl acetate hydrochloric acid and then 0.32 ml. (2.70 mmoles) of tert.butylnitrite are added dropwise, under stirring. The reaction mixture is stirred at −10°C for 5 minutes, cooled again to −20°C and a solution of 2.78 g. of Glu(OBu$^t$)-His-Phe-Arg-Trop-Gly-Lys(BOC)-Pro-Val-Gly and 1.4 ml. (8.13 mmoles) of diisopropyl-ethylamine in 23 ml. of dimethyl formamide is added. The mixture is stirred at -5° to 0°C for one hour, thereafter it is left to stand at 0°C overnight. Next day the solution is evaporated, and the residue is triturated with 8 percent aqueous sodium hydrocarbonate solution. The solids are filtered off, washed with water, and dried. The obtained 3.49 g. (94%) of protected substituted tetradecapeptide are suspended in 24 ml. of methanol, and a mixture of 4.75 ml. of cc. hydrochloric acid and 4.75 ml. of pyridine is added to the suspension. The thus-obtained solution is diluted with 240 ml. of water, the separated precipitate is filtered off, washed with water, and dried. 2.95 g. (73%) of the title compound are obtained, m.p.: 200°–202°C, $R_f^2 = 0.25$, empirical formula: $C_{91}H_{134}N_{21}O_{25}ClS$ (1989.68).

Step 5
BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr-(BU$^t$)-Pro-Asp(OBu$^t$)-Ala-Gly-Glu(OBu$^t$)-OBu$^t$.3HCl 0.350 g. (0.176 mmoles) of BOC-D-OSer-Tyr-Ser-Met-Glu(OBu$^t$)-His-Phe-Arg-Trp-Gly-Lys(BOC)-Pro-Val-Gly. .HCl, 0.400 g. (0.176 mmoles) of Lys(BOC)-Lys(BOC)-Arg-Arg-Pro-Val-Lys(BOC)-Val-Tyr-(Bu$^t$)-Pro-Asp(OBu$^t$)-Ala-Gly-Glu(OBu$^t$)-OBu$^t$.3HCl and 0.281 g. (1.05 mmoles) of PFPOH are dissolved in 3.3 ml. of dimethyl formamide, and 0.025 ml. (0.18 mmoles) of triethylamine and then 0.074 g. (0.36 mmoles) of DCC are added. The reaction mixture is left to stand at room temperature for 2 days, the separated DCU is filtered off, and the filtrate is diluted with 30 ml. of ether. The separated product is filtered off, washed with ether, and dried. 0.673 g. (90.7%) of the title compound are obtained, m.p.: 158°–162°C, $R_f^3 = 0.25$. Empirical formula: $C_{195}H_{313}N_{44}O_{50}Cl_3S$ (4212.33).

EXAMPLE 6

D-OSer-Tyr-Ser-Met-Glu-His-Phe-Arg-Trp-Gly-Lys-Pro-Val-Gly-Lys-Lys-Arg-Arg-Pro-Val-Lys-Val-Tyr-Pro-Asn-Gly-Ala-Glu-Asp-Glu-Ser-Ala 1.00 g. (0.214 mmoles) of BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(BU$^t$)-Pro-Asn-Gly-Ala-Glu(OBu$^t$)-Asp(OBu$^t$)-Glu(OBu$^t$)-Ser-Ala-OBu$^t$.3HCl are dissolved in a mixture of 8 ml. of trifluoroacetic acid, 1 ml. of water and 1 ml. of anisol. The solution is left to stand at room temperature for 1 hour, thereafter it is diluted with 200 ml. of ether. The separated precipitate is filtered off, washed with ether, and dried in vacuo over phosphorous pentoxide and potassium hydroxide. 0.90 g. (88%) of the substituted dotriacontapeptide trifluoro acetate are obtained.

The obtained crude trifluoro acetate is dissolved in 20 ml. of water, and the trifluoro acetate ions are exchanged for acetate ions using a Dowex 1×8 ion exchanger in the acetate form. The thus-obtained solution, containing now the acetate of the substituted dotriacontapeptide, is poured onto a Whatman CM-52 ion exchanger column, and eluted with a linear buffer gradient using 0.01 molar (pH 4.5) and 0.4 molar (pH 6.7) ammonium acetate buffers. The fractions containing the aimed product are collected and freeze-dried. 0.46 g. (46%) of the title compound are obtained.

The protected substituted dotriacontapeptide trihydrochloride, used as starting substance, is prepared as follows:

Step 1 Z-Glu(OBu$^t$)-Ser-Ala-OBU$^t$ 23.9 g. (100 mmoles) of Z-Ser and 14.5 g. (100 mmoles) of Ala-OBu$^t$ are dissolved in 150 ml. of methylene chloride, the solution is cooled to −10°C, and a solution of 20.6 g. (100 mmoles) of DCC in 100 ml. of methylene chloride is added dropwise at the same temperature. The reaction mixture is stirred at 0°C for 2 hours, and then left to stand at room temperature overnight. Next day the separated DCU is filtered off and the filtrate is washed with 3×70 ml. of n hydrochloric acid and 3×70 ml. of 5% aqueous sodium hydrocarbonate solution. The methylene chloride solution is dried and evaporated, the oily residue is dissolved in 50 ml. of ethyl acetate, and the solution is left to stand at 0°C for 4 hours. The separated DCU is filtered off, the filtrate is evaporated, and the oily residue is triturated with n-hexane. The thus-obtained 30.0 g. (82%) of crude Z-Ser-Ala-OBu$^t$ are dissolved in 600 ml. of methanol, and the solution is hydrogenated in the presence of 2 g. of 10% palladium-on-carbon catalyst. When the reaction terminates the catalyst is filtered off, and the filtrate is evaporated. The obtained Ser-Ala-OBu$^t$ is dissolved in 220 ml. of ethyl acetate, and 33.0 g. (76 mmoles) of Z-Glu(OBu$^t$)-ONSu are added to the solution. Next day the reaction mixture is washed with 3×50 ml. of n-hydrochloric acid and 3×50 ml. of aqueous sodium hydrocarbonate solution, dried, evaporated, and the residue is triturated with petroleum ether. The crude product is dissolved in ethyl acetate and precipitated with petroleum ether. 31.5 g (75 %) of the title compound are obtained, m.p.: 72°–74°C, R$_f^4$ = 0.6.

Analysis:
Calculated for C$_{27}$H$_{41}$N$_3$O$_9$ (551.84):
C: 58.8%; H: 7.5%; N: 7.65%.
Found: C: 58.8%; H: 7.7%; N: 7.8%.

Step 2 Glu(OBu$^t$)-Ser-Ala-OBu$^t$ 16.0 g. (29.0 mmoles) of Z-Glu(OBu$^t$)-Ser-Ala-Obu$^t$ are dissolved in 350 ml. of methanol, and the mixture is hydrogenated in the presence of 1.6 g. of 10 percent palladium-on-carbon catalyst. When the reaction terminates the catalyst is filtered off, the solvent is evaporated, and the residue is recrystallized from a mixture of methanol and ether. 9.06 g. (75%) of the title compound are obtained, m.p.: 135°–136°C, R$_f^4$ = 0.15, $[\alpha]_D^{25}$ = −25.9° (c = 1, in ethanol).

Analysis:
Calculated for C$_{19}$H$_{35}$N$_3$O$_7$ (417.80):
C: 54.6%; H: 8.5%; N: 10.1%.
Found: C: 54.5%; H: 8.4%; N: 9.8%.

Step 3 Z-Asp(OBu$^t$)-Ser-Ala-OBu$^t$ 8.2 g. (19.6 mmoles) of Glu(OBu$^t$)-Ser-Ala-OBu$^t$ and 8.0 g. (19.0 mmoles) of Z-Asp(OBu$^t$)-ONSu are dissolved in 80 ml. of ethyl acetate, and the solution is left to stand overnight. Next day the reaction mixture is washed with 3×20 ml. of n hydrochloric acid and 3×20 ml. of 5% aqueous sodium hydrocarbonate solution, dried, evaporated, and the residue is triturated with petroleum ether. 12.8 g. (85.5%) of the title compound are obtained, m.p.: 85°–87°C, R$_f^4$ = 0.55.

Analysis:
Calculated for C$_{35}$H$_{54}$N$_4$O$_{12}$ (722.81): N: 7.3%.
Found: N: 7.8%.

Step 4 Asp(OBu$^t$)-Glu(OBu$^t$)-Ser-Ala-OBu$^t$ 10.5 g. (14.5 mmoles) of Z-Asp(OBU$^t$)-Glu(OBU$^t$)-Ser-Ala-OBu$^t$ are dissolved in 130 ml. of methanol, and the mixture is hydrogenated in the presence of 1 g. of 10 percent palladium-on carbon catalyst. When the reaction terminates the catalyst is filtered off, the solution is evaporated, and the residue is suspended in petroleum ether and filtered. 8.35 g. (97.5%) of the title compound are obtained, m.p.: 80°–81°C, R$_f^4$ = 0.1, $[\alpha]_D^{25}$ = 24.3° (c = 1, in ethanol), empirical formula: C$_{27}$H$_{48}$N$_4$O$_{10}$ (588.68).

Step 5
Z-Glu(OBu$^t$)-Asp(OBu$^t$)-Glu(OBu$^t$-Ser-Ala-OBu$^t$ 5.0 g. (11.5 mmoles) of Z-Glu(OBu$^t$)-ONSu and 6.60 g. (11.2 mmoles) of Asp(OBu$^t$)-Glu(OBu$^t$)-Ser-Ala-OBu$^t$ are dissolved in 100 ml. of chloroform, and the mixture is left to stand overnight. Next day the mixture is washed with 3×30 ml. of n hydrochloric acid and 3×30 ml. of 5 percent aqueous sodium hydrocarbonate solution. The chloroform solution is dried, evaporated, and the gelly residue is triturated with petroleum ether. The separated crude product is dissolved in ethyl acetate, and precipitated with petroleum ether. 8.45 g. (83%) of the title compound are obtained, m.p.: 168°–169°C, R$_f^4$ = 0.5, $[\alpha]_D^{25}$ = −29.0° (c = 1, in ethanol).

Analysis:
Calculated for C$_{44}$H$_{69}$N$_5$O$_{15}$ (908.07):
C: 58.2%; H: 7.7%; N: 7.7%.
Found: C: 58.4%; H: 7.7%; N: 7.5%.

Step 6 Glu(OBu$^t$)-Asp(OBu$^t$)-Glu(OBu$^t$)-Ser-Ala-OBu$^t$ 8.0 g. (8.8 mmoles) of Z-Glu(OBu$^t$)-Asp(OBu$^t$)-Glu(OBu$^t$)-Ser-Ala-OBu$^t$ are dissolved in 160 ml. of methanol and the mixture is hydrogenated in the presence of 1.0 g. of 10 percent palladium-on-carbon catalyst. When the reaction terminates the catalyst is filtered off, the solution is evaporated, and the residue is suspended in a mixture of ether and petroleum ether. The solids are filtered off. 6.40 g. of the title compound are obtained, m.p.: 136°–138°C, R$_f^5$ = 0.1, $[\alpha]_D$ =−29.7° (c = 1, in ethanol). Empirical formula: C$_{36}$H$_{63}$N$_5$O$_{13}$ (773-94).

Step 7
Z-Ala-Glu(OBu$^t$)-Asp(OBu$^t$)-Glu(OBu$^t$)-Ser-Ala-OBu$^t$ 5.20 g. (6.7 mmoles) of Glu(OBu$^t$)-Asp(OBu$^t$)-Glu(OBu$^t$)-Ser-Ala-OBu$^t$ and 2.15 g. (6.7 mmoles) of Z-AlaONSu are dissolved in 50 ml. of chloroform, and the solution is left to stand overnight. Next day the mixture is washed with 3×10 ml. of n hydrochloric acid and 3×10 ml. of 5percent sodium hydrocarbonate solution, dried, and evaporated. The gelly residue is triturated with petroleum ether. 6.10 g. (93%) of the title compound are obtained, R$_f^5$ =0.5, m.p.: 194°–195°C, $[\alpha]_D$ = −30.9° (c = 1, in ethanol). Empirical formula: C$_{47}$H$_{74}$N$_6$O$_{16}$ (979.14).

Step 8
Ala-Glu(OBu$^t$)-Asp(OBu$^t$)-Glu(OBu$^t$)-Ser-Ala-OBu$^t$ 6.10 g. (6.2 mmoles) of Z-Ala-Glu(OBu$^t$)-Asp(OBu$^t$)-Glu(OBu$^t$)-Ser-Ala-OBu$^t$ are dissolved in 120 ml. of methanol, and the solution is hydrogenated in the presence of 1.0 g. of 10 percent palladium-on-carbon catalyst. When the reaction terminates the catalyst is filtered off, and the crystalline residue is recrystallized from a mixture of ethanol and ether. 4.35 g. (83%) of the title compound are obtained, m.p.: 192°–194°C, R$_f^5$ = 0.25, R$_f^1$ = 0.1, R$_f^2$ = 0.65.

Analysis:
Calculated for C$_{39}$H$_{68}$N$_6$O$_{14}$ (845.00):
C: 55.4%; H: 8.1%; N: 9.9%.
Found: C: 55.2%; H: 7.8%; N: 9.6%.

Step 9
Z-Asn-Gly-Ala-Glu(OBu$^t$)-Asp(OBu$^t$)-Ser-Ala-OBu$^t$ 2.45 g. (13.3 mmoles) of PFPOH, 1.31 g. (4.02 mmoles) of Z-Asn-Gly and 3.40 g. (4.02 mmoles) of Ala-Glu(OBu$^t$)-Asp(OBu$^t$)-Glu(OBu$^t$)-Ser-Ala-OBu$^t$ are dissolved in 24 ml. of dry dimethyl formamide, the solution is cooled to 0°C, and 0.915 g. (4.43 mmoles) of DCC are added. The reaction mixture is stirred at 0°C for 0.5 hours and then at room temperature for 2.5 hours, the separated DCU is filtered off, and the filtrate is evaporated. The solid residue is triturated with ethyl acetate and filtered. The crude product is boiled in 20 ml. of ethyl acetate, filtered, and washed with 2×10 ml.

of hot ethyl acetate. 4.12 g. (89%) of the title compound are obtained, m.p.: 200°–201°C, $R_f^1 = 0.60$. Empirical formula: $C_{53}H_{83}N_9O_{19}$ (1150.30).

Step 10
Asn-Gly-Ala-Glu(OBu$^t$)-Asp(OBu$^t$)-Glu-(OBu$^t$)-Ser-Ala-OBu$^t$ 4.0 g. (3.48 mmoles) of Z-Asn-Gly-Ala-Glu(OBu$^t$)-Asp(OBu$^t$)-Ser-Ala-OBu$^t$ are dissolved in 140 ml. of methanol, and the solution is hydrogenated in the presence of 0.5 g. of 10% palladium-on-carbon catalyst. When the reaction terminates the catalyst is filtered off, the filtrate is evaporated, and the residue is triturated with ether. 3.40 g. (96%) of title compound are obtained, m.p.: 188°–190°C, $R_f^2 = 0.5$, $[\alpha]_D = -6.6°$ (c = 0.89, in dimethyl formamide). Empirical formula: $C_{45}H_{77}N_9O_{17}$ (1016.17).

Step 11
Z-Lys(BOC)-Lys(BOC)-Arg(NO$_2$)-Arg(NO$_2$)-Pro-Val-Lys(BOC)-Val-Tyr(Bu$^t$)-Pro-Asn-Gly-Ala-Glu(OBu$^t$)-Asp(OBu$^t$)-Glu(OBu$^t$)-Ser-Ala-OBu$^t$ 3.0 g. (2.95 mmoles) of Asn-Gly-Ala-Glu(OBu$^t$)-Asp(OBu$^t$)-Glu(OBu$^t$)-Ser-Ala-OBu$^t$ and 5.46 g. (2.95 mmoles) of Z-Lys(BOC)-Lys(BOC)-Arg(NO$_2$)-Arg(NO$_2$)-Pro-Val-Lys(BOC)-Val-Tyr(Bu$^t$)-Pro (see British Patent No. 1.201.053) are dissolved in 33 ml. of dimethyl formamide, the solution is cooled to 0°C, and 3.35 g. (4.42 mmoles) of a DCC-PFPOH complex (J. Kovacs et al.: J. Am. Chem. Soc., 89, 183 /1967/) are added. The reaction mixture is kept at 0°C for 15 minutes, thereafter left to stand at room temperature for 6 hours. The separated DCU is filtered off, and the filtrate is poured into 450 ml. of dry ether. The obtained suspension is cooled overnight, the solids are filtered off, dissolved in methanol, and precipitated again with ethyl acetate. 7.18 g. (85.1%) of the title compound are obtained, $R_f^1 = 0.35$ $[\alpha]_D = -26.4°$ (c = 0.42, in dimethyl formamide). Empirical formula: $C_{131}H_{214}N_{30}O_{40}$ (2849.34).

Step 12
Lys(BOC)-Lys(BOC)-Arg-Arg-Pro-Val-Lys(BOC)-Val-Tyr(Bu$^t$)-Pro-Asn-Gly-Ala-Glu(OBu$^t$)-Glu(OBu$^t$)-Ser-Ala-OBu$^t$.3HCl 6.5 g. (2.28 mmoles) of Z-Lys(BOC)-Lys(BOC)-Arg(NO$_2$)-Arg(NO$_2$)-Pro-Val-Lys(BOC)-Val-Tyr(Bu$^t$)-Pro-Asn-Gly-Ala-Glu(OBu$^t$)-Asp(OBu$^t$)-Glu(OBu$^t$)-Ser-Ala-OBu$^t$ are dissolved in 85 ml. of acetic acid, and the mixture is hydrogenated in the presence of 2.0 g. of 10 percent palladium-on-carbon catalyst. When the reaction terminates the catalyst is filtered off, the filtrate is evaporated, and the oily residue is triturated with anhydrous ether. The solid substance is filtered off, dissolved in 70 ml. of water, the solution is acidified to pH = 4 with dilute hydrochloric acid, and the mixture is diluted with 30 percent aqueous sodium chloride solution. The separated solid is dissolved in a mixture of ethanol and chloroform, the solution is filtered the filtrate is evaporated, and the residue is triturated with ether. 5.6 g. (89.5 %) of the title compound are obtained, $R_f^2 = 0.35$, $[\alpha]_D = -26.1°$. (c = 1, in dimethyl formamide). Empirical formula: $C_{123}H_{213}N_{28}O_{34}Cl_3$ (2734.60).

Step 13
BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Arg-Arg-Pro-Val-Lys(BOC)-Val-Tyr(Bu$^t$)-Pro-Asn-Gly-Ala-Glu(OBu$^t$)-Asp(OBu$^t$)-Glu(OBu$^t$)-Ser-Ala-OBu$^t$.3HCl 0.525 g. (0.264 mmoles) of BOC-D-OSer-Tyr-Ser-Met-Glu(OBu$^t$)-His-Phe-Arg-Trp-Gly-Lys(BOC)-Pro-Val-Gly.HCl and 0.720 g. (0.264 mmoles) of Lys(BOC)-Lys(BOC)-Arg-Arg-Pro-Val-Lys(BOC)-Val-Tyr(Bu$^t$)-Pro-Asn-Gly-Ala-Glu(OBu$^t$)-Asp-OBu$^t$-Glu(OBu$^t$-Ser-Ala-OBu$^t$)-Ser-Ala-OBu$^t$.3HCl are dissolved in 4.0 ml. of dimethyl formamide, and 0.03 ml. (0.270 mmoles) of N-methyl morpholine then 0.23 g. (0.40 mmoles) of a DCC-PFPOH complex are added to the solution. The reaction mixture is left to stand at room temperature for two days. The separated DCU is filtered off, and the filtrate is diluted with 40 ml. of ether. The separated solids are filtered off, washed with ether, and dried. 1.10 g. (89%) of the title compound are obtained, m.p.: 182°–186°C, $R_f^3 = 0.27$. Empirical formula: $C_{214}H_{344}N_{49}O_{59}Cl_3S$ (4669.77).

What we claim is:

1. A peptide having a complete ACTH sequence from the N-terminal amino acid at least to the sixteenth amino acid wherein the first amino acid is replaced by an α-aminooxy acid selected from the group consisting of the α-aminooxy acids corresponding to glycine, L-alanine, D-alanine, L-serine and D-serine, and wherein the second amino acid is tyrosine or phenylalanine, the third amino acid is serine or glycine, the fourth amino acid is methionine, leucine, norvaline, norleucine or amino butyric acid, the fifth amino acid is glutamic acid or glutamine, the fifteenth and sixteenth amino acids are lysine or ornithine, and a salt of the said peptide with hydrochloric, sulfuric phosphoric, formic, acetic, lactic, tartaric, citric or fatty acids, the amide of the said peptide and a complex of said peptides with gelatine, carboxymethylcellulose, alginates, polyphlorethynphosphate, polymeric amides, the hydroxides or phosphates or pyrophosphates of zinc or silicates.

2. A peptide having a complete ACTH sequence from the N-terminal amino acid at least to the sixteenth amino acid, wherein the first amino acid is replaced by an α-aminooxy acid selected from the group consisting of the α-aminooxy acids corresponding to glycine, L-alanine, D-alanine, L-serine and D-serine, and a salt of the said peptide with hydrochloric, sulfuric, phosphoric, formic, acetic, lactic, tartaric, citric or fatty acids, the amide of the said peptide and a complex of said peptides with gelatine, carboxymethylcellulose, alginates, polyphlorethynphosphate, polymeric amides, the hydroxides or phosphates or pyrophosphates of zinc or silicates.

3. A peptide with adrenocorticotropic-hormonal activity selected from the group which consists of: Ogly-tyr-ser-met-glu-his-phe-arg-trp-gly-lys-pro-val-gly-lys-lys-arg-arg-pro-val-lys-val-tyr-pro-asp-ala-gly-glu, Oal-a-tyr-ser-met-glu-his-phe-arg-trp-gly-lys-pro-val-gly-lys-lys-arg-arg-pro-val-lys-val-tyr-pro-asp-ala-gly-glu, Oser-tyr-ser-met-glu-his-phe-arg-trp-gly-lys-pro-val-gly-lys-lys-arg-arg-pro-val-lys-val-tyr-pro-asp-ala-gly-gly, and Oser-tyr-ser-met-glu-his-phe-arg-trp-gly-lys-pro-val-gly-lys-lys-arg-arg-pro-val-lys-val-tyr-pro-asn-gly-ala-glu-asp-glu-ser-ala, wherein Ogly, Oala, Oser represent alpha-aminooxy acids respectively corresponding to the amino acids gly, ala and ser; the salts of said peptides with hydrochloric, sulfuric, phosphoric, formic, acetic, lactic, tartaric, citric or fatty acids; the amides of said peptides; and complexes of said peptides with gelatine, carboxymethylcellulose, alignates, polyphlorethynphosphate, polymeric amides, the hydroxides or phosphates or pyrophosphates of zinc, or silicates.

* * * * *